UNITED STATES PATENT

JOHN LORENZ, OF CHICAGO, ILLINOIS.

ARTIFICIAL STONE.

SPECIFICATION forming part of Letters Patent No. 509,924, dated December 5, 1893.

Application filed July 29, 1892. Serial No. 441,594. (No specimens.)

*To all whom it may concern:*

Be it known that I, JOHN LORENZ, a citizen of the United States, residing at Chicago, in the county of Cook and State of Illinois, have invented certain new and useful Improvements in the Composition of Artificial Stone, of which the following is a full, clear, and exact description, such as will enable those skilled in the art to which it appertains to make and use the same.

This invention relates to improvements in the composition of artificial stone, and it has for its object the provision of such a material as will be peculiarly adapted to the construction of chimneys of that class which are formed in sections and are built in with the brick or stone and form a part of the wall proper. In constructing chimneys of this character it is extremely important to have the sections molded into rectangular forms with a circular flue passing through the same so that they can be easily built in with the brick and have sufficient strength, which is given primarily by the material between the corners of the section and the flue, to sustain the strain and pressure of that part of the wall which they form. Owing to the comparative thinness of the walls of the chimney, it is also important to form the sections of a material which is to a great extent impervious to and not liable to decomposition by the gases of combustion and not liable to disintegration on being subjected to the action of the same and to the extremes of temperature and to moisture. Heretofore artificial stones have been used for this purpose. Generally, they have been composed of terra cotta or of gravel and cement. The use of terra cotta is objectionable as it is liable to scale or crack on being exposed to the extremes of temperature and to moisture, and it is to a considerable extent pervious to the gases of combustion. And also, when the sections are molded in rectangular forms, cylindrical forms are not suitable for the purpose as they do not join well with the brick and it is necessary to incase them with brick to properly support them, much difficulty is experienced in baking them, owing to the unequal thickness of the walls, the corners being much thicker than the sides. When the sections are formed of gravel and cement and molded into rectangular forms, their use is objectionable in view of the large amount of cement which it is necessary to use to combine the gravel, which greatly increases the cost and the cement when used in large proportions is liable to crack on being subjected to a high temperature. It is also objectionable as the dimensions to which the sections could be made are limited owing to the extreme weight of the composition, and furthermore this composition is to a considerable extent pervious to the gases of combustion.

It is proposed in the present instance to provide a composition for the manufacture of the sections which is of a comparatively light weight and consequently easily handled in large masses, which possesses sufficient strength for the purpose, which will not be liable to disintegration on exposure to the extremes of temperature and the gases of combustion and which is to a high degree impervious to the latter, which can be easily and cheaply made, and which is peculiarly adapted to be worked by tools.

The invention consists in combining ashes, cinders, burnt sand and cement in certain proportions hereinafter specified.

In carrying out the invention I take twenty parts of ashes, fifteen parts of cinders, two parts of burnt sand and seven parts of cement, mix them thoroughly together with water into a plastic mass and then mold the latter into suitable forms and allow it to thoroughly dry. The ashes and cinders which form a large proportion of the composition, render the latter comparatively light in weight and the burnt sand completely fills the spaces between the comparatively larger particles of ashes and cinders which are not filled with the cement and eliminates to a great extent the porous nature that it would otherwise possess and avoids to a considerable extent the use of more cement than would be necessary to hold the particles together.

Artificial stone composed of ashes, cinders and cement has been made, which, while it is suitable for ordinary building purposes, is not suitable to the construction of chimneys as it is too porous and would allow the gases of combustion to pass through the comparatively thin walls, which would be extremely objectionable, especially so if soft coal should be used as a fuel. Sand as it is ordinarily obtained would not serve the purpose very well as it is often mixed with foreign matter and impurities and possesses certain physical properties which would be acted on by the gases and heat of combustion to such an extent as to disintegrate the surface exposed to their action. Sand as it is ordinarily obtained is often mixed with lime, magnesia, and certain metallic oxides, and in the case of river sand, mud, which contains organic matter to some extent. All of these are liable to be changed in their chemical nature when exposed to heat and the gases of combustion. Even if the sand should be obtained in the form of pure silica, which is not often the case, while it would not be liable to any chemical change, yet the crystals of the same would be apt to be reduced to a powder on being subjected to a somewhat high degree of temperature. It is proposed in the present instance to obviate these objectionable features by first subjecting the sand to the action of heat and the gases generated by the combustion of coal before using the same in the composition so that any changes that it might be subjected to will be made before it is incorporated in the stone and hence not liable to such changes afterward.

I prefer to use the sand which is a waste product of foundries and which is termed in the art "burnt sand." In selecting sand for molding purposes it is sought to obtain that which contains the highest percentage of silica. As a matter of fact it is almost impossible to obtain it in large quantities which is free from impurities and it generally contains the foreign elements hereinbefore mentioned. In preparing the sand for molding purposes it is mixed with a quantity of coal dust and is dampened. When the melted metal comes in contact with this mixture the heat not only acts on the foreign matter liable to be changed by its application but it also generates gases from the coal dust. These gases attack the substances susceptible to their action. This would be especially so if the foreign matter should be calcium carbonate as the latter is extremely susceptible to the action of acids even if they are very much diluted. While the silica itself is not liable to any chemical changes by the application of heat, it is liable to certain physical changes. As it is often obtained it is in the form of comparatively large crystals which would crumble when heated to a high degree. It is obvious in view of the foregoing that sand so treated is peculiarly adapted to be used in the manner described, outside of its comparative cheapness as a by product.

Having thus described my invention, what I claim, and desire to secure by Letters Patent, is—

An artificial stone composed of ashes, cinders, burnt sand and cement, substantially as described.

In testimony whereof I affix my signature in presence of two witnesses.

JOHN LORENZ.

Witnesses:
W. H. STOLTE,
WILBUR W. BELL.